No. 804,767. PATENTED NOV. 14, 1905.
J. RAIDL.
LIQUID DISTRIBUTER.
APPLICATION FILED NOV. 21, 1904.

Witnesses
E. O. Niedebrauf
M. F. Anderson

Inventor:
Josef Raidl
by
George T. Massie
Attorney

UNITED STATES PATENT OFFICE.

JOSEF RAIDL, OF NIEDERWALTING, NEAR OBERSCHNEIDING, GERMANY.

LIQUID-DISTRIBUTER.

No. 804,767.　　　Specification of Letters Patent.　　　Patented Nov. 14, 1905.

Application filed November 21, 1904. Serial No. 233,679.

*To all whom it may concern:*

Be it known that I, JOSEF RAIDL, a citizen of Germany, residing at Niederwalting, Bavaria, Germany, have invented certain new and useful Improvements in Liquid-Distributers; and I do hereby declare the following to be a full, clear, and exact description of the invention, such as will enable others skilled in the art to which it appertains to make and use the same.

The present invention consists of a device for distributing dung-water over dunghills to prevent their becoming dry and useless.

In order to render the present specification intelligible, reference is had to the accompanying drawings, in which similar letters of reference denote similar parts throughout the several views.

Figure 3:
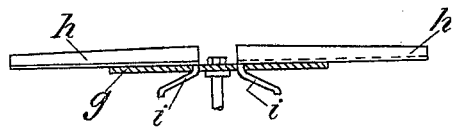
Figure 1:
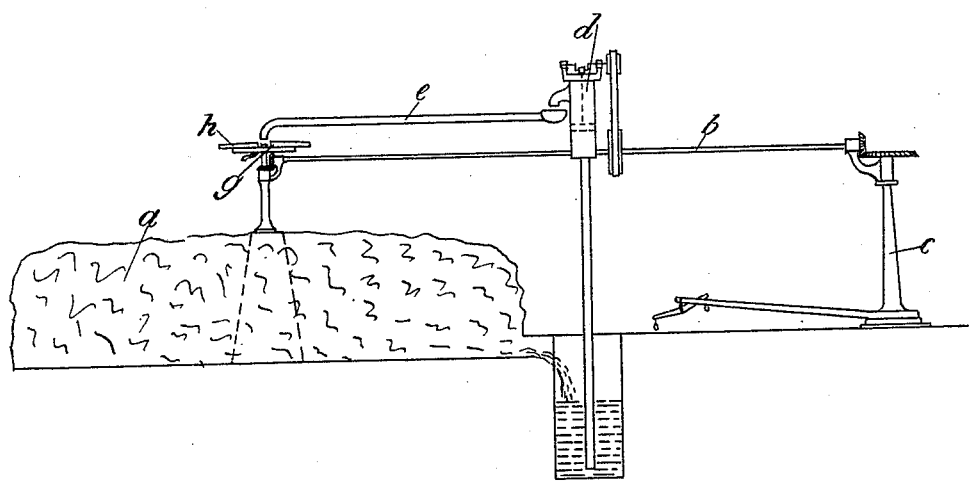
Figure 2:
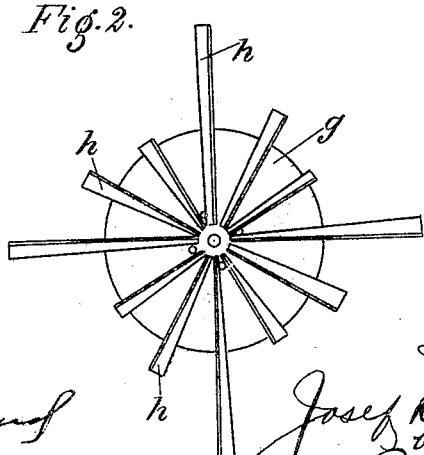

Figure 1 is a general arrangement of the device. Fig. 2 is a plan of the distributing-wheel, and Fig. 3 a side elevation of the same.

The dunghill is represented by *a*, and in the center of the same a wheel *g* is mounted on a vertically-supported shaft. This wheel consists of a suitable disk *g*, supported on a vertical shaft driven by means of a pair of bevel-gears from a horizontal shaft *b*, which is driven at its outer end from a whim *c*, operated by a horse or other motor power. The dung-water is taken from a suitable well by means of a dung-water pump *d*, which may also be driven from the shaft *b*, and is pumped into a hopper at the end of a pipe *e*, the opposite end of which directs the water to the center of the wheel *g*. On the wheel or disk *g* a series of angle-irons *h* are mounted of varying lengths, and as the dung-water is pumped onto the disk they distribute it in all directions and over the whole dunghill as the wheel is rotated. The disk *g* is further provided with downwardly-extending pipes *i*, (see Fig. 3,) from which the water is distributed to the central parts of the heap.

The operation of the device will be readily understood. When the whim is set going by the horse or other motive power, the pump *d* will be operated and the wheel *g* will be turned and the dung-water will be evenly distributed over the whole dung hill or heap.

It will be readily understood that the device might well be employed for watering lawns or for other similar purposes.

I claim as my invention—

1. A device for evenly distributing liquid over a given surface consisting of a wheel mounted to rotate in a horizontal plane, arms extending radially of the wheel for different distances, channels leading downwardly from the central portion of the wheel, means for supplying liquid to the surface of the wheel, and means for rotating the wheel.

2. A device for evenly distributing liquid over a given surface consisting of a wheel mounted to rotate in a horizontal plane and composed of a disk with arms extending radially from near the center toward and beyond the periphery of the disk, channels leading downwardly from the central portion of the disk near the inner ends of the radial arms, means for supplying liquid to the central portion of the upper face of the disk, and means for rotating the disk.

3. A device for evenly distributing liquid over a given surface consisting of a wheel having a disk and a series of radially-extending arms of angle-iron, the whole being mounted to rotate in a horizontal plane, a whim, a horizontally-mounted shaft driven by the said whim, a pump for the liquid and means for driving the same from the said horizontal shaft, and gears to rotate the said wheel from the said horizontal shaft and distributing-pipes extending downwardly from said disk in the manner and for the purpose substantially as described.

In testimony whereof I hereunto affix my signature in the presence of two witnesses.

JOSEF RAIDL.

Witnesses:
　ULYSSES J. BYWATER,
　ABRAHAM SCHLESINGER.